United States Patent [19]

Praat et al.

[11] Patent Number: 4,986,749

[45] Date of Patent: Jan. 22, 1991

[54] METHOD FOR DETERMINING A LEAK IN A BREAST WALL OF A REGENERATIVE HEAT RECUPERATOR

[75] Inventors: Cornelis N. A. Praat, Limmen; Lambertus Veld, Alkmaar, both of Netherlands

[73] Assignee: Hoogovens Groep B.V., IJmuiden, Netherlands

[21] Appl. No.: 473,053

[22] Filed: Jan. 31, 1990

[30] Foreign Application Priority Data

Dec. 8, 1989 [NL] Netherlands ............. 8900318

[51] Int. Cl.⁵ ............................................. F27D 17/00
[52] U.S. Cl. ......................................... 432/28; 73/40.7
[58] Field of Search ............... 431/2, 22; 432/28; 73/40.7

[56] References Cited

U.S. PATENT DOCUMENTS 2,757,362  7/1956  Gutkowski ............................. 431/22
3,015,357  1/1962  Bain et al. ............................. 432/28
3,087,064  4/1963  Curtice et al. .
3,522,008  7/1970  Defabaugh et al. .

Primary Examiner—Carroll B. Dority
Attorney, Agent, or Firm—Stevens, Davis, Miller & Mosher

[57] ABSTRACT

The method is to determine a leak in a breast wall of a regenerative heat recuperator having a combustion chamber and a heat storage chamber containing a heat storage medium adjacent to the combustion chamber and separated therefrom by a breast wall. The combustion chamber has inlet means for fuel and air and the heat storage chamber has outlet means for the flue gases which pass into it from the combustion chamber. To achieve a simple and accurate determination, the method comprises the steps of (i) while passing gas through the recuperator, introducing to the inlet means a marker gas which undergoes an irreversible change at a temperature prevailing in the recuperator, and (ii) detecting the presence of the marker gas in the gases passing out of the outlet means.

9 Claims, 1 Drawing Sheet

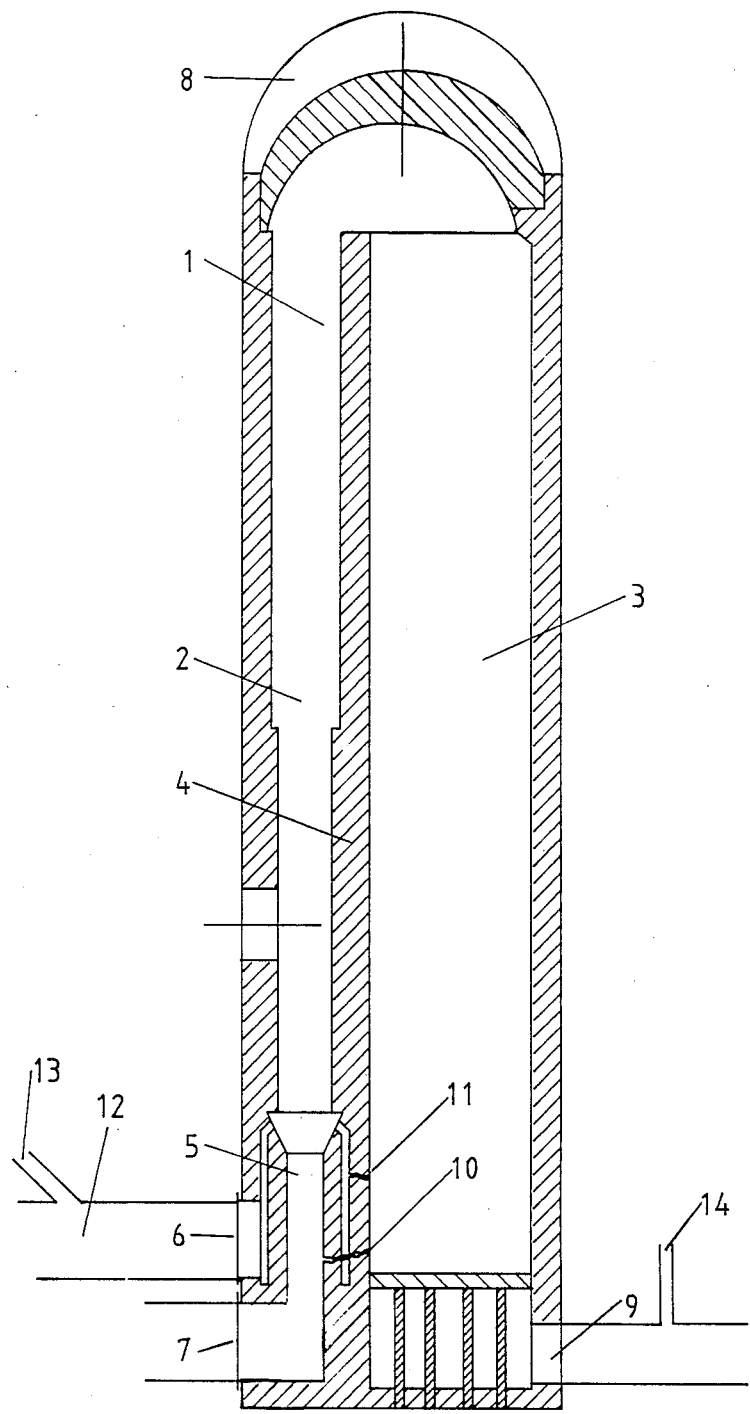

METHOD FOR DETERMINING A LEAK IN A BREAST WALL OF A REGENERATIVE HEAT RECUPERATOR

BACKGROUND OF THE INVENTION

1. Field of the Invention

The invention relates to a method for determining a leak in a breast wall of a regenerative heat recuperator and is especially applicable to a ceramic heat recuperator such as a hot-blast stove for a blast furnace.

2. Description of the Prior Art

A ceramic heat recuperator generally has a combustion chamber and a checkerwork chamber, both of shaft shape, generally parallel to each other and separated by a breast wall. The combustion chamber is provided with inlet means for air and fuel and the checkerwork chamber is provided with an outlet port for the discharge of the burned combustion gases, herein called flue gases. The checkerwork chamber contains a checkerwork which is a stack of ceramic bricks having passages for the flue gases, as a heat storage medium.

In a first phase of operation, a fuel, usually gaseous, is burned with air in a burner built into the combustion chamber. The hot flue gases are led out of the combustion chamber into the checkerwork chamber in which the combustion gases give off sensible heat to the stacked bricks. In a second operating phase air is led in the opposite direction through the heat recuperator thereby taking with it heat from the checkerwork. The heated air leaves the heat recuperator via a hole in the combustion chamber and may be used for example as hot blast for a blast furnace.

The dividing wall between the combustion chamber and the checkerwork chamber is brought up to temperatures which vary greatly on the combustion chamber side and the checker chamber side, and particularly at the lower region in the recuperator where the burner is situated. In the breast wall itself and at locations bonding to the outer shell this may result in cracking. Cracks in the breast wall may extend from the inlet for combustion air and fuel up to the checkerwork. A quantity of combustion air escapes through the resulting crack towards the checkerwork chamber without participating in the combustion. One result is that the fuel is not totally burned and the flue gases contain carbon monoxide. In order to make the combustion total, the volume of combustion air to be supplied by pumps must be further increased. This makes the heat generator efficiency fall because of the increased pumping required. With large leaks the pump capacity may even be too low for supplying sufficient combustion air for a total combustion.

In the past various methods of testing have been used to determine a leak in a breast wall by measuring the concentration of a gas component in the flue gas. Gas components chosen for this were carbon monoxide and oxygen i.e. gases produced by the combustion or in the combustion air. An inconvenience of that method of testing is that no distinction can be made between the results of a badly functioning burner and a leak in the breast wall. Therefore, using sampling pipes projecting through the bottom of the heat generator, it has been attempted to extract gas from a position in the checkerwork chamber close to the breast wall and to compare the oxygen concentration occurring there with the oxygen concentration in the discharge gas. This method of testing requires arrangements which are difficult to install, and yet gives only little information about the extent of the leakage.

SUMMARY OF THE INVENTION

The object of the invention is to provide an effective method for determining a leak in a breast wall of a heat recuperator which preferably gives information about the size of the leak.

Another object of the invention is to provide a method which can be carried out simply and quickly without affecting the running of the heat generator to any great extent.

The method in accordance with the invention is characterized in that a marker gas or test gas is fed in via the inlet means, this being a gas that undergoes an irreversible change, e.g. chemically or in a physical property, at a temperature prevailing in the recuperator and in that the marker gas is detected in the outlet gases.

The invention is based on the assumption that the part of the air and/or the gaseous fuel with marker gas in it, which escapes out of the combustion chamber to the heat storage chamber through a leak, does not reach a temperature at which the marker gas undergoes irreversible change, while air mixed with fuel and marker gas flowing along the normal route through the heat recuperator does come above the temperature at which the irreversible change takes place. The concentration of the marker gas in the flue gas at exit of the recuperator is consequently a measure for the quantity of gas which passes through a leak in the breast wall.

Suitably the marker gas plays no part in the combustion, i.e. is not combustible at the temperatures reached in the recuperator. Thus the marker gas is not part of air and not a fuel gas.

The marker gas is preferably a gas in which the irreversible change is a dissociation. By dissociation above a certain temperature, the marker gas is removed completely from the gas flow following the normal route through the heat recuperator, and the marker gas is only present in the gas which has flowed through a leak. By means of a selective measurement directed at the marker gas, the amount of marker gas in the discharged gases may be measured, and the size of the leak may be determined from the test results.

Particularly the marker gas may be sulphur hexafluoride. Under normal temperature and pressure sulphur hexafluoride is a gas and dissociates at about 600° C. This is the temperature which occurs in a hot-blast stove of a blast furnace just above the ring of a burner in the combustion chamber. As already explained above, the part of the breast wall beneath the burner head is the most susceptible to cracking. The pressure variation across the breast wall is also at its highest in this part of it, so that a leak at this position also has the greatest effect.

Suitably the marker gas is added at a concentration of at least 100 ppm to the air to be fed through the inlet means. It has been found that with such a concentration of marker gas in the gas supplied, preferably in the air supplied, a detrimental leak in the breast wall may be determined well, while the marker gas in the supplied air may be metered by simple means. In particular it is then not necessary to provide extra means of heating for the sulphur hexafluoride compressed into liquid under pressure.

In one embodiment of the method of the invention, the determination of a leak is done at at least two differing feed rates of air through the inlet means. By measuring at at least two differing feed rates of air, it is possible to eliminate distortions in the measurements. In this, it is preferable to make one measurement at a maximum feed rate of air because in this case the pressure across the breast wall is at its greatest and any crack present lets through the greatest quantity of gas.

The method of the invention is preferably performed during combustion of the fuel and air, but alternatively it may be performed while combustion is not taking place but while the recuperator is sufficiently hot to cause the irreversible change of the marker gas. Thus only air and the marker gas are passed through the recuperator.

BRIEF INTRODUCTION OF THE DRAWING

An embodiment of the invention will now be described by way of non-limitative example with reference to the single FIGURE of the drawing.

DESCRIPTION OF THE PREFERRED EMBODIMENT

The FIGURE shows in general a heat recuperator 1 in the form of a hot-blast stove for a blast furnace. The hot-blast stove comprises a combustion shaft 2 and a parallel checkerwork shaft 3 for heat storage which are separated from each other by a breast wall 4. A ceramic burner 5 is positioned low down in the combustion shaft. Combustion air is fed in through an inlet port 6 and fuel in the form of a combustible gas through an inlet port 7. The mixture of combustion air and combustible gas burns in the combustion shaft 2. The flue gases produced by the combustion rise up the combustion shaft 2, are led through the dome 8, then pass through the checkerwork shaft 3 which is filled with a heat storage medium in the form of a permeable stack of bricks, known as checker bricks and there give off heat to the checker bricks. The cooled flue gases leave the hot-blast stove through the outlet ports 9, of which one is shown in the drawing. This is one phase of operation. In the second phase, air is passed in the reverse direction through the checkerwork shaft, and is heated.

If a crack 10 or a crack 11 forms in the breast wall 4 a part of the combustion air or the combustible gas fed in will penetrate the crack and, without having participated in the combustion, will be entrained with the flue gases in the lowest part of the checkerwork shaft and then escape through the outlet port 9 In the method in accordance with the invention, the quantity of gas which passes through the leaks 10 and 11 is simple to measure. To this end a known quantity of marker gas, specifically sulphur hexafluoride, is mixed in the air supply line 12 with the combustion air via a marker gas inlet 13. A part of the combustion air, mixed with sulphur hexafluoride passes through the cracks 10 and 11. At the outlet ports 9 the discharged gas is sampled by means of test line 14. All the sulphur hexafluoride in the discharge gas will have leaked through the cracks 10 and 11. Sulphur hexafluoride that arrives via the burner into the upper part of the combustion shaft dissociates irreversibly there and then is carried away in dissociated form. The temperature just above the ring of the burner is about 600° C. Using otherwise known process parameters the quantity of gas which has passed through cracks 10 and 11 may be calculated in a simple way from the concentration of sulphur hexafluoride in the discharge gas.

The marker gas may be introduced into both the fuel gas and the air.

Preferably at least one measurement is made under maximum combustion air supply rate because then the pressure drop across a crack is at maximum as is also the quantity of gas passing through it. This simplifies the detection.

In practice it has been found possible to make two measurements in a period of time less than the time taken by one single operation phase, that is in less than approximately one hour, moreover without disturbing normal running of the process by doing so.

What is claimed is:

1. Method for determining a leak in a breast wall of a regenerative heat recuperator having a combustion chamber and a heat storage chamber containing a heat storage medium adjacent to the combustion chamber and separated therefrom by a breast wall, the combustion chamber having inlet means for fuel and air and the heat storage chamber having outlet means for the flue gases which pass into it from the combustion chamber, the method comprising the steps of
   (i) while passing gas through said recuperator, introducing via said inlet means a marker gas which undergoes an irreversible change at a temperature prevailing in the recuperator, and
   (ii) detecting the presence of said marker gas in the gases passing out of said outlet means.

2. Method according to claim 1 wherein said marker gas is not a combustible gas at the temperature in the recuperator.

3. Method according to claim 1 wherein said irreversible change of said marker gas is dissociation.

4. Method according to claim 3 wherein said marker gas is sulphur hexafluoride.

5. Method according to claim 4 wherein the marker gas is introduced at a concentration of at least 100 ppm to the air passing to said inlet means.

6. Method according to claim 1 wherein said steps (i) and (ii) are performed at at least two flow rates of air to said inlet means.

7. Method according to claim 1 wherein said step (ii) comprises measuring the concentration of said marker gas in said gases passing out of said outlet means.

8. Method according to claim 1 which is performed during combustion of said fuel and air.

9. Method according to claim 1 which is performed while combustion is not taking place but while the recuperator is sufficiently hot to cause said irreversible change.

* * * * *